United States Patent
McGee

[15] 3,693,964
[45] Sept. 26, 1972

[54] TRAILER SPRING SUSPENSION
[72] Inventor: Donald J. McGee, Troy, Mich.
[73] Assignee: H & H Equipment Co., Troy, Mich.
[22] Filed: Dec. 16, 1970
[21] Appl. No.: 98,605

[52] U.S. Cl. .................................................267/56
[51] Int. Cl. ..............................................B60g 11/04
[58] Field of Search.....................280/124 R; 267/56

[56] References Cited

UNITED STATES PATENTS

| | | | |
|---|---|---|---|
| 2,986,389 | 5/1961 | Coonrod | 267/56 |
| 3,103,350 | 9/1963 | Chosy | 267/56 X |

FOREIGN PATENTS OR APPLICATIONS

| | | | |
|---|---|---|---|
| 927,984 | 5/1947 | France | 267/56 |

*Primary Examiner*—Robert G. Sheridan
*Attorney*—Whittemore, Hulbert & Belknap

[57] ABSTRACT

A longitudinal, semi-elliptic type leaf spring assembly, clamped at its midpoint to a vehicle axle, is connected at one end to a vehicle frame by a shoulder bolt or stud unit extending upwardly with slight clearance through a hole in the longest leaf of the assembly, the latter in effect having a non-binding hinging action in the zone of the stud unit as the spring deflects. A similar stud unit connects the opposite end of the assembly to the frame, but in this case it extends through elongated slot in the longest spring leaf, affording a combined hinging and laterally confined longitudinal sliding action at this zone in relation to the frame as the spring assembly elongates during flexure. Conventional spring eyes and shackles are eliminated.

10 Claims, 5 Drawing Figures

PATENTED SEP 26 1972
3,693,964
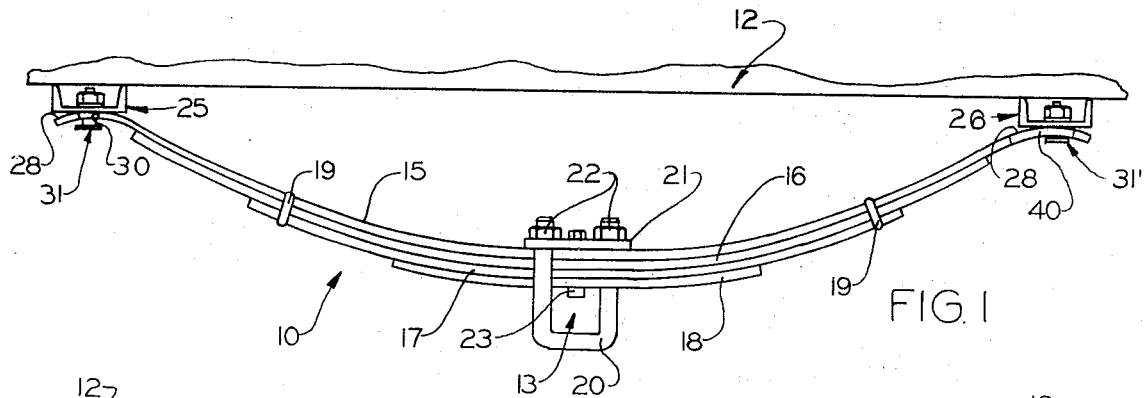
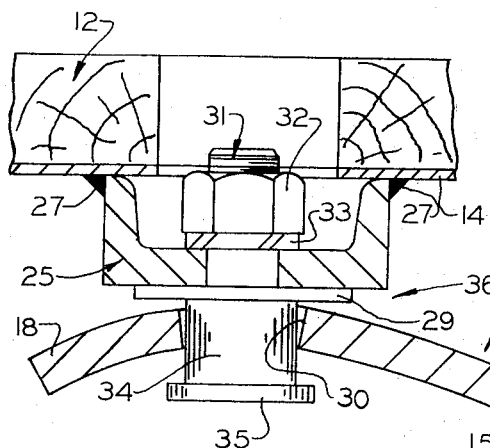
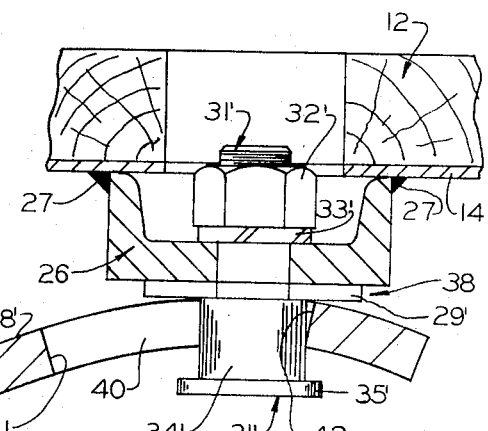
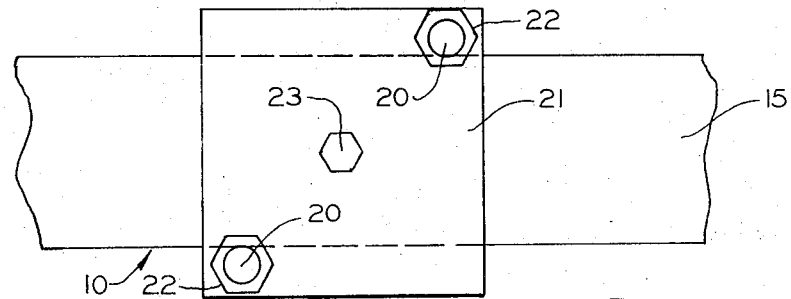
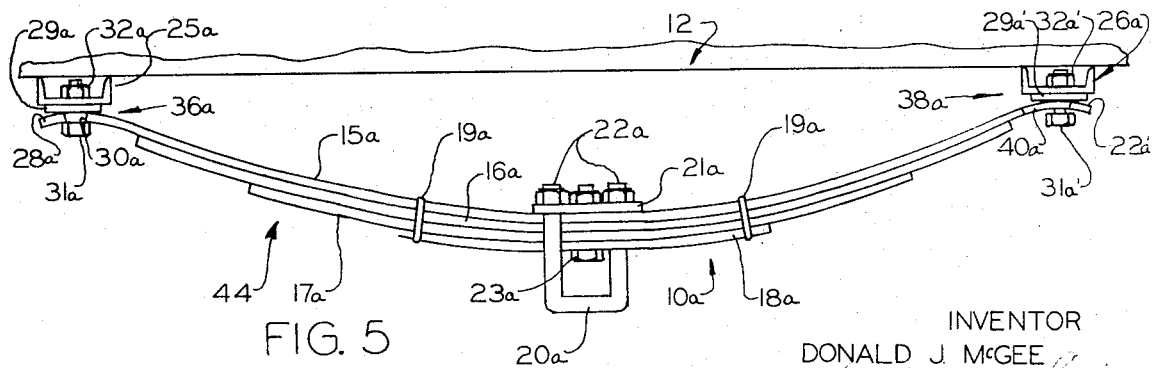
INVENTOR
DONALD J. McGEE
BY Whittemore, Hulbert &
Belknap
ATTORNEY

TRAILER SPRING SUSPENSION

BACKGROUND OF THE INVENTION — FIELD

The improvement of the invention finds widest application, perhaps, in a longitudinal suspension mounting a simple trailer type, drawn vehicle to a transverse wheel axle. However, applications to other and more refined types of wheeled vehicles are contemplated. Likewise, the principal of the invention may be carried out in a transverse type of leaf spring suspension, i.e., one in which the suspension parallels a floating axle, as an example. A multiple axle installation is also contemplated.

SUMMARY OF THE INVENTION

In the case of previous spring suspensions of the same general type, it has been the universal custom to connect opposite ends of a semi-elliptic spring assembly to a vehicle frame, as on opposite sides of a center axle connection, by a swinging coupling of one sort or another at opposite eye-formed spring ends in order to accommodate the longitudinal elongation of the assembly in flexure. Typically, this has been done at the front by an appropriate bracket shackle and clevis permitting a limited swing of the front spring end about a horizontal transverse axis, and another more involved connection, as by means of a swinging shackle and clevis unit, between the frame and the rear end of the spring assembly such as to accommodate the longitudinal shift of that end of the assembly to the rear, and vice versa, upon elongation in flexure.

Such conventional arrangements obviously entail the not inconsiderable expense of the duplicated clevis, shackle bolt and link and/or other spring to frame mounting means making possible a hinging action at one spring end, and a combined hinging and shifting action at the other end, all coupled with a necessary confined positioning of the spring assembly as a whole relative to the axle and frame, i.e., the maintenance of proper side restraint on the assembly.

The suspension of the present improvement permits a major diminution as to production cost, as compared with the previous arrangements, in that shackle, clevis or other equivalent provisions for the mentioned purposes are completely eliminated. A desired lateral restraint and longitudinal positioning of the leaf spring stack relative to the frame and axle is provided by a simple shoulder bolt or stud connection of one spring end to a frame cross member, allowing a desired limited but non-binding strictly hinging or rolling action at that end, as about a transverse horizontal axis; and a very similar, equally simple connection is in effect at the opposite end of the spring assembly. It differs from the first in that it permits not only the desired hinging effect, but also accommodates a front-to-rear slide of the spring stack relative to a second frame cross member engaged, thereby to accommodate unrestricted spring elongation.

The two shoulder bolt connecting members, as well as the cross members engaged thereby, are identical at opposite ends of the spring unit, thus affording a cost-decreasing standardization of parts. Likewise, elongated barrel portions and enlarged heads of the shoulder bolts keep the axle attached to the trailer frame even when an axle wheel, or both wheels lose contact with a supporting surface.

The only actual structural difference in regard to the opposite ends of the spring unit resides in the face that there is a circular bolt or stud-receiving hole at one end thereof, while the aperturing at the other end is in the form of an elongated slot paralleling and between the sides of the inner spring of the assembly. Friction between the apertured spring ends and the respective frame members movably engaged thereby is reduced by making those ends mildly arcuate and convex in relation to the cross members.

Installation of the spring units on the vehicle frame is quick and easy, for it requires no welding of frame brackets, nor assembly of eye bushings or shackles; and a conventional U-bolt unit mounts the spring assembly to the axle. Further, a safety factor is built into the improved suspension, for if for any reason the front leaf should fail in service the axle remains fixed to the trailer frame by the rear bolt or stud.

BRIEF DESCRIPTION OF THE DRAWING

FIG. 1 is a fragmentary view in side elevation of one embodiment of a semi-elliptic spring suspension assembly according to the invention, as operatively applied to a trailer frame;

FIGS. 2 and 3 are respectively fragmentary views in considerably enlarged scale of the connections at opposite ends of the suspension, being in a vertical plane including the longitudinal center line of the spring unit;

FIG. 4 is a fragmentary top plan view showing a U-bolt and plate connection of the spring assembly to the vehicle axle; and FIG. 5 is a fragmentary elevational view similar to FIG. 1 of another embodiment of the invention.

DESCRIPTION OF PREFERRED EMBODIMENTS

FIGS. 1, 2, 3 and 4 illustrate a presently preferred embodiment of the invention, essentially represented by a semi-elliptic type leaf spring assembly or unit which is generally designated 10 and has improved means to mount it to a frame and axle. This will ordinarily be employed, as herein disclosed, as a longitudinal suspension spring, i.e., in which identical assemblies 10 are arranged adjacent and parallel to opposite sides of a vehicle frame and the latter's longitudinal frame members 12, being at 90° to the trailer vehicle axle 13. However, the suspension 10 is also well suited for use in a transverse arrangement paralleling the axle, for example, in a floating axle installation. Frame beam 12 is shown as being faced by a metal sheath 14 (FIGS. 2 and 3).

As shown in FIG. 1, the left-hand end of the suspension assembly 10 will normally be its front end and right-hand its rearward, although the reverse may be the arrangement. Axle 13 is shown as being square in cross section, although a circular or other section is of course contemplated.

The assembly 10 comprises an inner or top-most, full length spring leaf 15 and, typically, second, third and fourth lower (or more) leaves 16, 17 and 18, conventionally of decreasing order in length, the leaves 15, 16 and 17 being secured in top-to-bottom order by conventional clips 19 and a center bolt later referred to. Of course, however, a unit employing but a single spring is contemplated. A U-bolt 20 angularly and upwardly straddles the leaves 15 – 18 to effect the connection to axle 13, the legs of this bolt passing through openings in a top clamp plate 21 and being held by nuts 22 applied thereto. The further center bolt 23 of the assembly takes through aligned apertures of the stacked springs and axle clamp plate 21. In certain installations the spring assembly may bolt directly to trailer deck; the cross/member design is one adaptation, but there may be a number of deck designs where a cross/member is not necessary.

The semi-elliptic assembly 10 is mounted to the frame 12 through the agency of rigid metal front and rear cross/members or beams 25, 26 of channel-shaped section; these are respectively welded at 27 to the bottom of the frame member sheath 14 adjacent the front and rear ends of unit 10.

The suspension 10 is devoid of the usual connecting eye formations at its ends. Instead, as best shown in FIGS. 2 and 3, the front end of uppermost spring leaf 15 is mildly curved convexly at 28 in relation to the front mounting surface at cross/member 25; and a wear washer or plate 29 may be interposed between this arcuate portion of leaf 15 and the bottom of the cross channel member 25, enabling the leaf to have a limited but free rocking or rolling action on the bottom of the washer 29.

As shown in FIG. 2, a circular opening 30 is formed in arcuate end portion 28 of the spring, being located midway between the latter's side edges; and a headed shoulder stud or bolt 31 is applied upwardly through the opening 30 and aligned openings of frame 25 and washer 29, with a nut 32 and split lock washer 33 taken up tightly on the stud 31. This clamps the upper shoulder of an enlarged intermediate barrel portion 34 of the stud, which is the portion received in spring opening 30 (or as an equivalent a bushing sleeved on a stud shank) upwardly against the wear washer 29 and member 25. Barrel portion 34 of the stud extends substantially downwardly beneath the leaf hole 30, being equipped with an enlarged restraining head 35 of substantially larger diameter than the hole 30, thus permitting a lift of the wheels of the vehicle without separating from the spring unit.

The effect of this front spring mounting unit, as generally designated by the reference numeral 36, is to locate the spring assembly 10 properly, front-to-rearwise and laterally, in relation to the frame member 12 and axle 13, there being but slight side clearance of stud 31 in the spring leaf opening 30, sufficient only to allow spring leaf deflection without binding at the stud 31.

As appears in FIG. 3, the corresponding mounting unit, specially designated 38, at the rear end of the spring suspension 10 is substantially identical to the mount 36. Accordingly, to the extent of the sameness of its components, parts thereof corresponding to parts shown in FIG. 2 are designated by corresponding reference numeral, primed, and further description is dispensed with.

An important feature of difference in regard to the rear mount 38 resides in the fact that in this case the stud or bolt 31' extends through an elongated slot 40 centered, at the arcuate portion 28'; between the sides of spring leaf 15. In the relaxed condition of suspension 10 a substantial length of this slot extends to the left of the barrel portion 34' of stud 31', terminating in an end wall 41; and the right-hand slot end wall 42 has but slight clearance in relation to the barrel formation.

Thus in action under flexure the spring leaf 15 will in effect have a hinging motion at the zone of engagement of its front arcuate formation 28 with the wear washer 29, this action being the equivalent of a fixed clevis-type pivoting of the end about a horizontal transverse axis, the formation 28 rolling with little or no friction and negligible slide beneath washer 29.

On the other hand, at the opposite, rear mounting unit 38, it is evident that a combined rocking and sliding action takes place under reversing flexure of upper spring leaf 15 and the spring assembly 10 as a whole. This accommodates the longitudinal elongation and contraction of the assembly in operation; and when flexure ceases and the suspension returns to a neutral, unstressed condition, the slot end 42 (FIG. 3) of spring leaf 15 resumes its position closely adjacent the stud barrel portion 34'.

It is therefore seen that the stud or bolt mounting arrangements 36, 38 perform all of the static and dynamic functions of conventional connecting clevis and/or combined clevis and shackle units, yet at but a fraction of the cost of the latter, both in point of cost of parts and cost of assembly.

FIG. 5 shows a slightly modified embodiment, generally designated by the reference numeral 44, of the spring suspension assembly, as operatively applied to, and in a relaxed condition on a trailer or like vehicle frame structure. Features of this arrangement are very similar to what is shown in FIG. 1 – 4; accordingly, corresponding parts and relationships are correspondingly designated, but with the distinguishing character $a$. Thus, the spring assembly 44 is shown as being composed of one or more semi-elliptic leaves, shown as four designated 15a – 18a, all banded as a stack by clips 19a. Pursuant to the invention, the feature of arcing the opposite ends of upper spring 15a at 28a and 28a', as well as the circular aperturing of the spring at 30a and slotting of its opposite end at 40a, are identical to what has been described above.

However, in this instance the spacer and wear washers or plates 29a and 29l' have internal threads threadedly engaged by the shanks of the like studs or bolts 34, 34a', being also threadedly engaged from above the wear washers by the nuts 32a, 32a'. The washers are directly welded to the bottom of the channel cross/members 25a, 26a.

Despite their slight structural differences the action of the leaf spring assemblies 10 and 44 in flexure are identical, insofar as performing all the functions of clevis and shackle connections in locating, laterally confining and accommodating flexing elongation of the spring. Standardized stud and nut connectors are employed, further diminishing production cost as compared with comparable spring suspensions presently in use.

What is claimed is:

1. A vehicle spring suspension, comprising a spring unit having a plurality of horizontally elongated spring leaves clipped in stacked relation to one another, a leaf of said unit being provided adjacent an end and between the sides thereof with a first vertical aperture of limited longitudinal extent in the direction of the length of the leaf, a first stud-like member received in said aperture with relatively small radial clearance and engageable with a vehicle frame to provide a limited hinging action of said leaf end relative to the frame, said spring leaf being provided adjacent the opposite end and between the sides thereof with an elongated aperture of substantially greater longitudinal extent than said first aperture and terminating short of said opposite end, and another stud-like member received in said elongated aperture with substantial clearance relative to said terminating end thereof and engageable with the vehicle frame to provide a combined hinging and longitudinal sliding action of said leaf relative to the frame adjacent said elongated aperture and other stud-like member.

2. The suspension of claim 1, in which said stud-like members are substantially identical.

3. The suspension of claim 2, and further comprising a pair of frame members fixed to the frame and extending transversely thereof, to which frame members the respective stud-like members are respectively connected.

4. The suspension of claim 1, and further comprising a pair of frame members fixed to the frame and extending transversely thereof, to which frame members the respective stud-like members are respectively connected.

5. The suspension of claim 4, and further comprising wear members interposed between the respective frame members and the respective spring leaf ends, said ends movably contacting said wear members in the springing action of the assembly.

6. The suspension of claim 5, in which the respective ends of said spring leaf at which said apertures are formed are convexly arcuate in reference to the respective frame members.

7. The suspension of claim 4, in which the respective ends of said spring leaf at which said apertures are formed are convexly arcuate in reference to the respective frame members.

8. The suspension of claim 6, in which said stud-like members have headed lower parts spanning the transverse dimension of said apertures.

9. The suspension of claim 1, in which the respective ends of said spring leaf at which said apertures are formed are convexly arcuate in reference to the respective frame members.

10. The suspension of claim 9, in which said frame-engaging members have headed lower parts spanning the transverse dimension of said apertures.

* * * * *